(12) United States Patent
Huh et al.

(10) Patent No.: US 10,059,190 B2
(45) Date of Patent: Aug. 28, 2018

(54) POWER TRANSMISSION SYSTEM OF HYBRID ELECTRIC VEHICLE

(71) Applicant: Hyundai Motor Company, Seoul (KR)

(72) Inventors: Jun Hoi Huh, Seoul (KR); KwangMin Choi, Seoul (KR); Tae Sic Park, Busan (KR); Jae Heon Lee, Gyeonggi-Do (KR); Seongeun Park, Gyeonggi-do (KR); Buhm Joo Suh, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/400,543

(22) Filed: Jan. 6, 2017

(65) Prior Publication Data

US 2018/0029462 A1    Feb. 1, 2018

(30) Foreign Application Priority Data

Jul. 27, 2016    (KR) .......................... 10-2016-0095525

(51) Int. Cl.
*F16H 3/085*    (2006.01)
*B60K 6/547*    (2007.10)
(Continued)

(52) U.S. Cl.
CPC .............. *B60K 6/547* (2013.01); *B60K 6/365* (2013.01); *B60K 6/387* (2013.01); *F16H 3/085* (2013.01);
(Continued)

(58) Field of Classification Search
CPC ...... F16H 37/0806; F16H 3/724; F16H 3/725; F16H 37/046; F16H 2037/047;
(Continued)

(56) References Cited

U.S. PATENT DOCUMENTS 8,641,573 B2 *    2/2014    Ideshio .................. B60K 6/365
                                                                  475/218
9,109,682 B2 *    8/2015    Lee ........................ F16H 37/046
(Continued)

FOREIGN PATENT DOCUMENTS

JP    2009-184433 A    8/2009
JP    2010-513107 A    4/2010
(Continued)

*Primary Examiner* — Roger L Pang
(74) *Attorney, Agent, or Firm* — Mintz Levin Cohn Ferris Glovsky and Popeo, P.C.; Peter F. Corless

(57) ABSTRACT

A power transmission system of a hybrid electric vehicle uses an engine and a motor/generator as power sources, and includes: a torque converter including a planetary gear set having first, second, and third rotating elements, the first rotating element being selectively connected to a transmission housing, the second rotating element being connected to an engine output shaft of the engine, and the third rotating element being connected to a motor output shaft of the motor/generator; an input device including a first input shaft selectively connected to the motor output shaft through one clutch and a second input shaft that is disposed on a same shaft line as the first input shaft to be selectively connected to the motor output shaft through another clutch; and a shift output device shifting and outputting rotation power of the input device.

12 Claims, 4 Drawing Sheets

(51) Int. Cl.
  *F16H 3/72* (2006.01)
  *B60K 6/365* (2007.10)
  *B60K 6/387* (2007.10)
  *F16H 37/08* (2006.01)

(52) U.S. Cl.
  CPC ......... *F16H 3/724* (2013.01); *F16H 37/0806* (2013.01); *B60Y 2200/92* (2013.01); *B60Y 2400/428* (2013.01); *B60Y 2400/73* (2013.01); *F16H 2306/48* (2013.01); *Y10S 903/91* (2013.01); *Y10S 903/914* (2013.01); *Y10S 903/919* (2013.01)

(58) Field of Classification Search
  CPC .. B60K 6/547; B60K 3/365; B60Y 2400/428; B60Y 2400/73; Y10S 903/91; Y10S 903/919
  USPC .............................. 475/5, 150, 151, 207, 343
  See application file for complete search history.

(56) References Cited

U.S. PATENT DOCUMENTS

| | | | | |
|---|---|---|---|---|
| 9,676,265 B2* | 6/2017 | Choi | ....................... | B60K 6/365 |
| 2008/0208422 A1* | 8/2008 | Shibata | .................. | B60K 6/365 |
| | | | | 701/54 |
| 2012/0259496 A1* | 10/2012 | Ikegami | ................. | B60K 6/365 |
| | | | | 701/22 |

FOREIGN PATENT DOCUMENTS

| | | | |
|---|---|---|---|
| JP | 2014-092271 | A | 5/2014 |
| KR | 10-1294089 | B1 | 8/2013 |
| KR | 10-1448792 | B1 | 10/2014 |

\* cited by examiner

POWER TRANSMISSION SYSTEM OF HYBRID ELECTRIC VEHICLE

CROSS-REFERENCE TO RELATED APPLICATION

This application claims under 35 U.S.C. § 119(a) the benefit of Korean Patent Application No. 10-2016-0095525 filed in the Korean Intellectual Property Office on Jul. 27, 2016, the entire contents of which are incorporated herein by reference.

BACKGROUND

(a) Technical Field

The present disclosure relates to a power transmission system of a hybrid electric vehicle, and more particularly, to a power transmission system of a hybrid electric vehicle capable of implementing smooth launching and shifting by adding a motor/generator and a torque converter to a double clutch transmission so as to improve fuel consumption and acceleration performance.

(b) Description of the Related Art

Development of environmentally-friendly technology applicable to a vehicle is important to the automobile industry, and car makers have focused energy on the development of an environmentally-friendly vehicle to satisfy environment and fuel efficiency regulations.

Therefore, car makers have developed an electric vehicle (EV), a hybrid electric vehicle (HEV), a fuel cell electric vehicle (FCEV), and the like, as environmentally-friendly technology.

Since vehicles have several technical restrictions such as weight, cost, and the like, car makers have paid particular attention to the hybrid electric vehicle as an alternative to other technologies so as to satisfy exhaust gas regulations and enhance fuel efficiency performance, and continue to commercialize the hybrid electric vehicle.

The hybrid electric vehicle is a vehicle two or more power sources that may be combined in several ways. For example, a combination of a gasoline engine or a diesel engine using traditional fossil fuel and a motor/generator driven by electrical energy may be used.

The hybrid electric vehicle uses as a main power source the motor/generator having relatively better low speed torque characteristics at a low speed and uses as a second main power source an engine having relatively better high speed torque characteristics at a high speed.

Therefore, since the hybrid electric vehicle ceases operation of the engine using fossil fuel and uses the motor/generator in a low speed section, the hybrid electric vehicle may improve fuel consumption and reduce exhaust gases.

Further, one example of the transmission that may be applied to the above-mentioned hybrid electric vehicle may be a double clutch transmission ("DCT"). Here, the DCT applies two clutches to a manual transmission, thereby increasing efficiency and improving convenience.

That is, the DCT is a transmission that applies two clutches to perform shifting while alternately operating in an odd stage and an even stage. As described above, a mechanism to alternatively operate the shifting of the odd stage and the even stage may improve a torque interruption of the existing manual transmission (MT) and automatic manual transmission (AMT) upon shifting.

However, the DCT causes a large clutch damage and energy loss due to a clutch slip upon launching and causes excessive backward pushing due to the clutch slip upon climbing launching, and therefore has a safety problem. Further the DCT controls a shift time to be short due a problem of clutch heat capacity, and therefore involves a problem in that a shift shock is greater than an automatic transmission.

Further, to apply the DCT to the hybrid electric vehicle, the DCT has a problem in that the motor/generator that is an electric power source needs to be effectively disposed.

The above information disclosed in this Background section is only for enhancement of understanding of the background of the disclosure and therefore it may contain information that does not form the prior art that is already known in this field to a person of ordinary skill in the art.

SUMMARY

The present disclosure provides a power transmission system of a hybrid electric vehicle capable of implementing smooth launching and shifting by adding a motor/generator and a torque converter to a double clutch transmission, thereby improving fuel consumption by implementing regenerative braking, and improving acceleration performance by being supplemented with torque of the motor/generator.

An exemplary embodiment of the present disclosure provides a power transmission system of a hybrid electric vehicle using an engine and a motor/generator as power sources, the power transmission system including: a torque converter configured to have a planetary gear set having first, second, and third rotating elements, the first rotating element being selectively connected to a transmission housing, the second rotating element being connected to an engine output shaft of the engine, and the third rotating element being connected to a motor output shaft of the motor/generator; an input device configured to have a first input shaft that is selectively connected to the motor output shaft through one clutch and has at least one input gear fixedly disposed thereon and a second input shaft that is disposed on a same shaft line as the first input shaft to be selectively connected to the motor output shaft through another clutch and has the at least one input gear fixedly disposed thereon; and a shift output device shifting and outputting rotation power of the input device.

In the input device, the second input shaft may be a hollow shaft and the first input shaft may be disposed on the same shaft line by penetrating through a hollow portion of the second input shaft.

The torque converter may be disposed in a space of an inner diameter part of a rotor of the motor/generator.

The torque converter may be configured to have a single pinion planetary gear set having the first rotating element that is a sun gear, the second rotating element that is a planetary carrier, and the third rotating element that is a ring gear.

The shift output device may include first and second output shafts disposed in parallel with the first and second input shafts and may be configured to have a plurality of change gears that are disposed on the first and second output shafts in a state in which the shift output device is engaged with input gears on the first and second input shafts to be selectively synchronous-connected to the first output shaft or the second output shaft by each synchronous unit.

As the at least one input gear fixedly disposed on the second input shaft, a first input gear operated as second-shift and reverse-shift input gears and a second input gear operated as fourth-shift and sixth-shift input gears may be sequentially disposed from front to back and as the at least one input gear fixedly disposed on the first input shaft, a third input gear operated as a fifth-shift input gear, a fourth input gear operated as a first-shift input gear, and a fifth input gear operated as a third-shift input gear may be sequentially disposed from front to back.

The shift output device may include: a first shift output mechanism that selectively synchronous-connects four change gears to the first output shaft by a selective operation of first and second synchronizers disposed on a first output shaft disposed in parallel with the first and second input shafts to output the rotation power at four shift ratios; a second shift output mechanism that selectively synchronous-connects three change gears to the second output shaft by a selective operation of third and fourth synchronizers disposed on a second output shaft disposed in parallel with the first and second input shafts to output the rotation power at three shift ratios; and a reverse output mechanism that is configured to have a reverse shaft disposed in parallel with the second input shaft and reverse input gears disposed on the reverse shaft to be engaged between one of the input gears on the second input shaft and one of the change gears on the second output shaft.

The first synchronizer may selectively synchronous-connect a second-shift change gear engaged with the first input gear and a fourth-shift change gear engaged with the second input gear to the first output shaft.

The second synchronizer may selectively synchronous-connect a first-shift change gear engaged with the fourth input gear and a third-shift change gear engaged with the fifth input gear to the first output shaft.

The third synchronizer may selectively synchronous-connect a reverse change gear engaged with the reverse input gears to be power-connected to the first input gear and a sixth-shift change gear engaged with the second input gear to the second output shaft.

The fourth synchronizer may selectively synchronous-connect a fifth-shift change gear engaged with the third input gear to the second output shaft.

The idle gears may be configured to have a large-diameter first reverse input gear disposed on the reverse shaft to be engaged with the first input gear and a small-diameter second reverse input gear engaged with the reverse change gear.

According to an exemplary embodiment of the present disclosure, the motor/generator that is an electric power source and the planetary gear set that is the torque converter may be applied to the existing DCT structure, thereby implementing the smooth launching and shifting.

Further, the regenerative braking may be implemented upon the deceleration while driving, thereby improving the fuel consumption.

Further, the torque supplement may be achieved by the motor/generator that is the electric power source upon the acceleration, thereby improving the acceleration performance.

Further, the planetary gear set PG that is the torque converter may be disposed in a space of an inner diameter part of the motor/generator, thereby minimizing the whole length.

Further, the 1:1 gear ratio of the overdrive of the engine and the motor based on the input speed of the shift part may be implemented by the planetary gear set that is the torque converter to increase the shift gear ratio, thereby minimizing the capacity of the motor/generator to reduce the weight and production costs.

Further, the effects which may be obtained or predicted by the exemplary embodiment of the present disclosure will be directly or implicitly disclosed in the detailed description of the exemplary embodiments of the present disclosure. That is, various effects which are predicted by the exemplary embodiments of the present disclosure will be disclosed in the detailed description to be described below.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
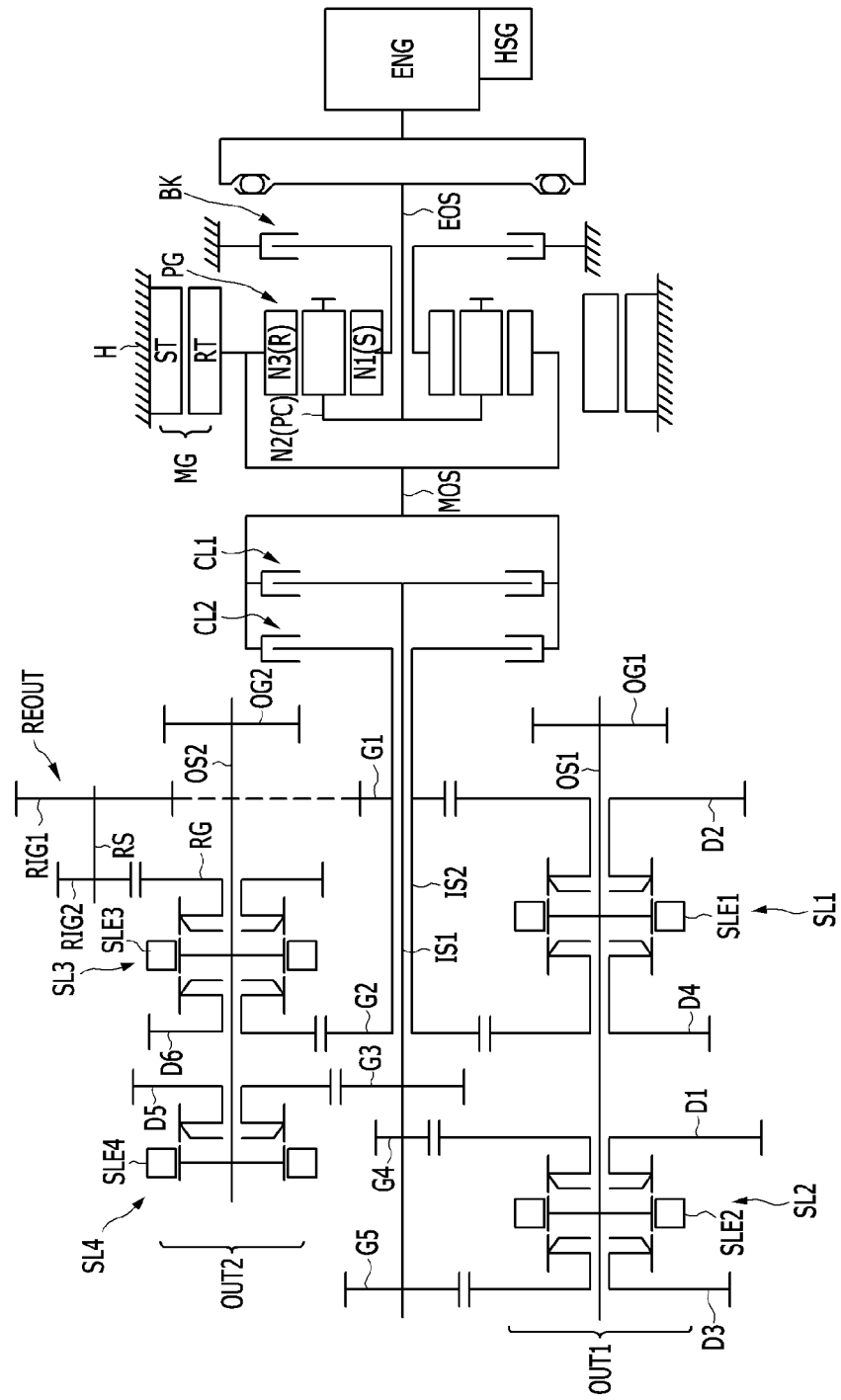
FIG. 1 is a schematic diagram of a power transmission system of a hybrid electric vehicle according to an exemplary embodiment of the present disclosure.

FIG. 1 is a schematic diagram of a power transmission system of a hybrid electric vehicle according to an exemplary embodiment of the present disclosure.

Referring to FIG. 1, the power transmission system of a hybrid electric vehicle according to the exemplary embodiment of the present disclosure uses an engine and a motor/generator as power sources and is configured to have a torque converter, an input device, and a shift output device.

The torque converter is configured to have a planetary gear set PG, and according to the exemplary embodiment of the present disclosure, a single pinion planetary gear set having three rotating elements is applied.

The three rotating elements are configured to have first rotating elements N1 that are a sun gear S, a second rotating element N2 that is a planetary carrier PC, and third rotating element N3 that is a ring gear R.

The first rotating element N1 is operated as a selective fixed element while being selectively connected to a transmission housing H having a brake BK interposed therebetween.

The second rotating element N2 is directly connected to an engine output shaft (EOS) of an engine ENG that is a power source to be operated as an input element.

The third rotating element N3 is directly connected to a motor output shaft (MOS) of the motor/generator MG to be operated as an output element transmitting rotation power to a transmission mechanism, and at the same time is directly connected to a motor/generator MG that is an electric power source to be transmitted with the rotation power of the motor/generator MG or otherwise transmit rotation power of the engine ENG to the motor/generator MG.

The motor/generator is an electric supplementary drive unit and is configured to have a rotor RT and a stator ST like being applied to a typical electric vehicle to simultaneously perform the motor/generator functions.

As described above, the rotor RT is connected to the motor output shaft MOS along with a third rotating element N3 of the planetary gear set PG that is the torque converter and the stator ST is fixed to the transmission housing H.

The input device is configured to have a first input shaft IS1 and a second input shaft IS2.

The first input shaft IS1 is a real shaft to be disposed on a same shaft line as the engine output shaft EOS and the motor output shaft MOS, and thus a front end portion of the first input shaft IS1 is selectively connected to the motor output shaft MOS and the second input shaft IS2 is a hollow shaft to be disposed on an outer circumference of a front side portion of the first input shaft IS1 without a rotation interference, and thus a front end portion of the second input shaft IS2 is selectively connected to the motor output shaft MOS.

First and second input gears G1 and G2 are fixedly disposed at the second input shaft IS2 at a predetermined interval from each other.

Third, fourth, and fifth input gears G3, G4, and G5 are fixedly disposed at the first input shaft IS1 at a predetermined interval from one another. Here, the third, fourth, and fifth input gears G3, G4, and G5 are positioned at a back portion penetrating through the second input shaft IS2 and are sequentially disposed from front to back.

As described above, the first, second, third, fourth, and fifth input gears G1, G2, G3, G4, and G5 are the input gears for each shift stage and the number of gear teeth is set so that the first input gear G1 may be operated as the input gear for implementing a second shift and a backward movement, the second input gear G2 may be operated as the input gear for implementing a fourth shift and a sixth shift, the third input gear G3 may be operated as the input gear for implementing a fifth shift, the fourth input gear G4 may be operated as the input gear for implementing a first shift, and the fifth input gear G5 may be operated as the input gear for implementing a third shift.

That is, the first input shaft IS1 is provided with the input gear for odd shift stages and the second input shaft IS2 is provided with the input gear for even shift stages and reverse shift stages.

The input device is variably connected to the motor output shaft MOS that transmits the rotation power from the engine ENG and the motor/generator MG through a first clutch CL1 and a second clutch CL2.

The first clutch CL1 is disposed between the first input shaft IS1 and the motor output shaft MOS to control the rotation power transmitted from the engine ENG and the motor/generator MG to the first input shaft IS1.

The second clutch CL2 is disposed between the second input shaft IS2 and the motor output shaft MOS to control the rotation power transmitted from the engine ENG and the motor/generator MG to the second input shaft IS2.

That is, the first and second clutches CL1 and CL2 are a typical multi-plate wet clutch and thus may be controlled to be operated and non-operated by a hydraulic control system (not illustrated). In addition, the first and second clutches CL1 and CL2 may also be a typical multi-plate dry clutch.

The shift output device that is transmitted with power from the respective input gears of the input device and shifts and outputs the power is configured to have first and second shift output mechanisms OUT1 and OUT2 disposed in parallel with the first and second input shafts IS1 and IS2 at a predetermined interval and a reverse output mechanism REOUT.

The first shift output mechanism OUT1 is configured to have a first output shaft OS1 disposed in parallel with the first and second input shafts IS1 and IS2 at a predetermined interval, second and fourth-shift change gears D2 and D4, first and third-shift change gears D1 and D3, a first synchronizer SL1 that is a synchronous unit disposed on the first output shaft IS1 to be selectively synchronous-connected to the second or fourth-shift change gear D2 or D4 to the first output shaft OS1, and a second synchronizer SL2 that is a synchronous unit selectively synchronous-connecting the first and third-shift change gears D1 and D3 to the first output shaft IS1.

The second-shift change gear D2 is engaged with the first input gear G1 and the fourth-shift change gear D4 is engaged with the second input gear G2.

The first-shift change gear D1 is engaged with the fourth input gear G4 and the third-shift change gear D3 is engaged with the fifth input gear G5.

Further, the rotation power shifted by the first shift output mechanism OUT1 is transmitted to the known differential mechanism through a first output gear OG1 that is mounted at a front end portion of the first output shaft OS1.

The second shift output mechanism OUT2 is configured to have a second output shaft OS2 disposed in parallel with the first and second input shafts IS1 and IS2 at a predetermined interval, a reverse change gear RG, a sixth-shift change gear D6, a fifth-shift change gear D5, a third synchronizer SL3 that is a synchronous unit disposed on the second output shaft OS2 to be selectively synchronous-connected to the reverse change gear RG or the sixth-shift change gear D6 to the second output shaft OS2, and a fourth synchronizer SL4 that is a synchronous unit to selectively synchronous-connect the fifth-shift change gear D5 to the second output shaft OS2.

The reverse change gear RG is engaged with a reverse input gear of the reverse output mechanism REOUT to be described below and the sixth-shift change gear D6 is engaged with the second input gear G2.

The fifth-shift change gear D5 is engaged with the third input gear G3.

Further, the rotation power shifted by the second shift output mechanism OUT2 is transmitted to the known differential mechanism through a second output gear OG2 that is mounted at a front end portion of the second output shaft IS2.

The reverse output mechanism REOUT is configured to have a reverse shaft RS, a first reverse input gear RIG1 having a large diameter gear, and a second reverse input gear RIG2 having a small diameter gear.

The reverse shaft RS is disposed in parallel with the first and second output shafts IS1 and IS2, the first reverse input gear RIG1 is engaged with the first input gear G1, and the second reverse input gear RIG2 always keeps an engaged state with the reverse change gear RG.

Therefore, if reverse shifting is made, the rotation power of the first input gear G1 is reversely transmitted to the reverse change gear RG through the first and second reverse input gears RIG1 and RIG2, and the reversely shifted rotation power is transmitted to the known differential mechanism through the second output shaft OS2.

The above-mentioned first, second, third, and fourth synchronizers SL1 to SL4 are known components, and therefore the detailed description thereof will be omitted, in which each of the sleeves SLE1, SLE2, SLE3, and SLE4 applied to the first, second, third, and fourth synchronizers SL1 to SL4 include a separate actuator (not illustrated) as known and the actuator is controlled by a transmission control unit.

In FIG. 1, reference numeral HSG is named a hybrid starter generator, in which the HSG is connected to a crank shaft of the engine ENG by a typical belt driving scheme to be used to control the starting and speed of the engine ENG but when the HSG fails, the engine ENG starts by the motor/generator MG.

Both of the HSG and the motor/generator MG have a function of a motor and a generator and are configured to be electrically connected to a high-performance battery B to be able to be supplied with power or charged.

The power transmission system of a hybrid electric vehicle configured as described above may perform driving of EV, HEV, engine driving, and regenerative braking modes by the operation of the torque converter and the motor/generator MG while performing multistage shifting like the double clutch transmission.

Further, the torque converter and the motor/generator MG may perform the existing engine clutch function.

Figure 2:
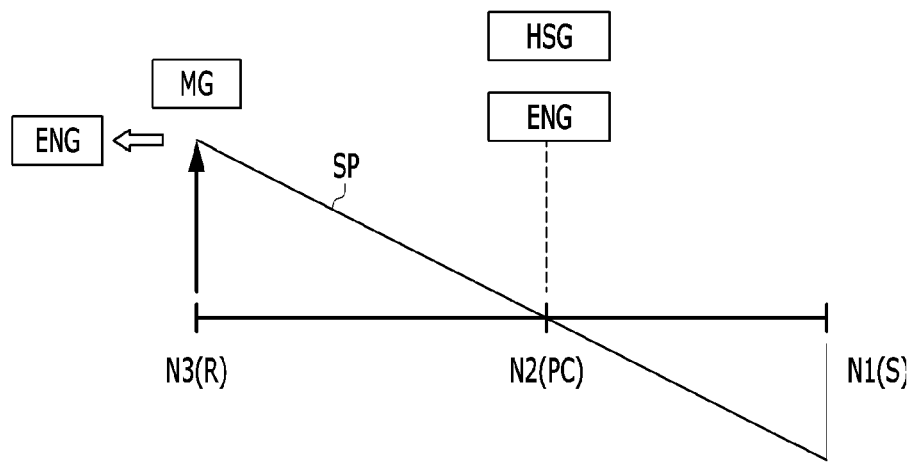
FIG. 2 is an operation level diagram of a torque converter in an EV mode of the power transmission system of a hybrid electric vehicle according to the exemplary embodiment of the present disclosure.

FIG. 2 is an operation level diagram of a torque converter in an EV mode of the power transmission system of a hybrid electric vehicle according to the exemplary embodiment of the present disclosure.

Referring to FIG. 2, in the EV mode, a driving torque of the motor/generator MG is transmitted to a shift part, which is configured to have the input device and the conversion output device, through the motor output shaft MOS to perform shifting and the engine ENG keeps a stop state.

Therefore, the planetary gear set PG that is the torque converter performs an input to the third rotating element N3 and resultantly operates the second rotating element N2 as a fixed element, such that it performs the EV mode driving while forming a speed lines SP of each rotating element as illustrated in FIG. 2.

Figure 3:
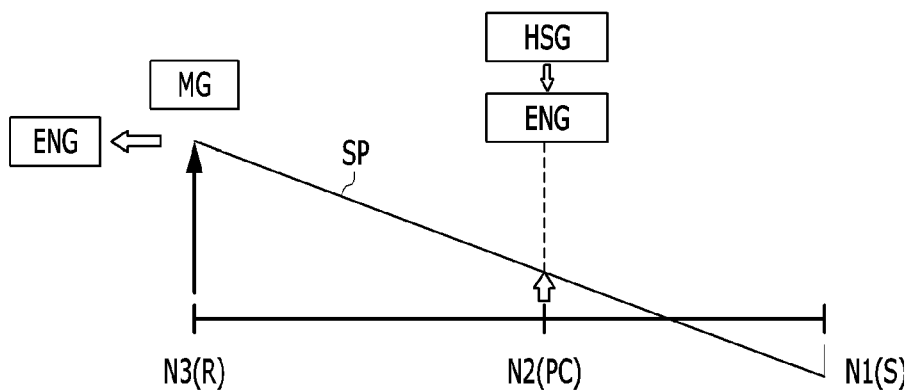
FIG. 3 is an operation level diagram of the torque converter upon the starting of the engine in the EV mode of the power transmission system of a hybrid electric vehicle according to the exemplary embodiment of the present disclosure.

FIG. 3 is an operation level diagram of the torque converter upon the starting of the engine in the EV mode of the power transmission system of a hybrid electric vehicle according to the exemplary embodiment of the present disclosure.

Referring to FIG. 3, the starting of the engine in the EV mode is made by cranking of the engine ENG based on the driving torque of the HSG while the EV mode driving is performed.

In this case, the HSG controls a speed depending on the speed of the motor/generator MG connected to the third rotating element N3 to minimize a shock upon the starting of the engine ENG and performs the starting of the engine ENG in the EV mode driving while forming the speed line SP of each rotating element as illustrated in FIG. 3.

Figure 4:
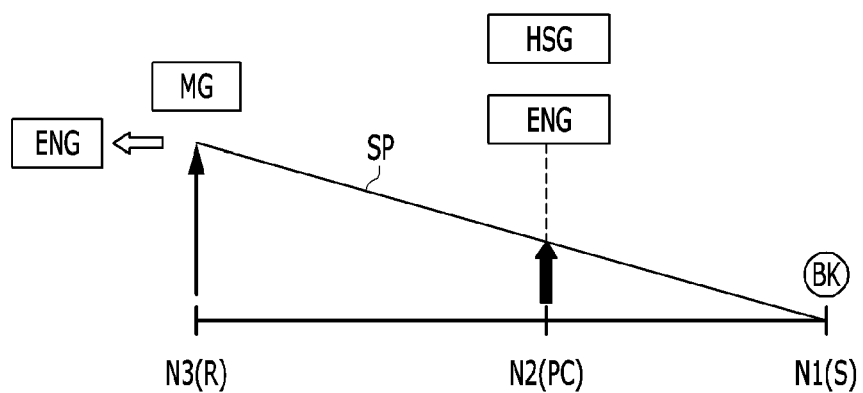
FIG. 4 is an operation level diagram of a torque converter in an HEV mode of the power transmission system of a hybrid electric vehicle according to the exemplary embodiment of the present disclosure.

FIG. 4 is an operation level diagram of the torque converter in the HEV mode of the power transmission system of a hybrid electric vehicle according to the exemplary embodiment of the present disclosure.

Referring to FIG. 4, if the HEV mode driving controls a rotation speed of the engine ENG to be increased after the starting of the engine ENG is made as illustrated in FIG. 3 and makes the rotation speed reach 0 RPM that is a target speed of the first rotating element N1, that is, a sun gear S, a sun gear N2 that is the first rotating element N1 is operated as the fixed element while a brake BK is operated.

Therefore, the HEV mode combines the driving torques of the engine ENG and the motor/generator MG at the motor output shaft MOS while forming the speed line SP of each rotating element as illustrated in FIG. 4 and transmits the combined driving torque to the shift part.

Further, the driving by the engine driving excludes only the driving torque of the motor/generator MG in the state as illustrated in FIG. 4 but transmits the driving torque of the engine ENG to the shift part through the motor output shaft MOS while forming the same speed line SP.

Further, if the rotation power of the engine ENG or the motor/generator MG is transmitted to the shift part through the motor output shaft MOS by the processes as illustrated in FIGS. 2 to 4 or the two rotation powers by the engine ENG and the motor/generator MG are combined and transmitted to the shift part through the motor output shaft MOS, the shift part performs the shifting while performing the same operation as the existing DCT.

The shift process of the DCT is already known, and therefore the detailed description thereof will be omitted and if the motor/generator MG that is the electric supplementary drive unit is operated during the forward and reverse driving, the regenerative braking may be made.

As described above, according to an exemplary embodiment of the present disclosure, the motor/generator MG that is the electric power source and the planetary gear set PG that is the torque converter may be applied to the existing DCT structure, thereby implementing the smooth launching and shifting.

Further, regenerative braking may be implemented upon the deceleration while driving, thereby improving the fuel consumption.

Further, torque supplement may be achieved by the motor/generator MG upon acceleration, thereby improving the acceleration performance.

Further, the planetary gear set PG that is the torque converter may be disposed in the space of the inner diameter part of the rotor RT of the motor/generator MG, thereby minimizing the whole length.

Further, the 1:1 gear ratio of the overdrive of the engine and the motor based on an input speed of a shift part may be implemented by the planetary gear set PG that is the torque converter to increase a shift gear ratio, thereby minimizing the capacity of the motor/generator MG to reduce the weight and production costs.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A power transmission system of a hybrid electric vehicle using an engine and a motor/generator as power sources, the power transmission system comprising:
    a torque converter configured to have a planetary gear set having first, second, and third rotating elements, the first rotating element being selectively connected to a transmission housing, the second rotating element being connected to an engine output shaft of the engine, and the third rotating element being connected to a motor output shaft of the motor/generator;
    an input device configured to have a first input shaft that is selectively connected to the motor output shaft through one clutch and has at least one input gear fixedly disposed thereon and a second input shaft that is disposed on a same shaft line as the first input shaft to be selectively connected to the motor output shaft through another clutch and has at least one input gear fixedly disposed thereon; and
    a shift output device shifting and outputting rotation power of the input device,
    wherein the shift output device includes first and second output shafts disposed in parallel with the first and second input shafts and is configured to have a plurality of change gears that are disposed on the first and second output shafts in a state in which the shift output device is engaged with input gears on the first and second input shafts to be selectively synchronous-connected to the first output shaft or the second output shaft by each synchronous unit.

2. The power transmission system of claim 1, wherein in the input device, the second input shaft is a hollow shaft and the first input shaft is disposed on the same shaft line by penetrating through a hollow portion of the second input shaft.

3. The power transmission system of claim 1, wherein the torque converter is disposed in a space of an inner diameter part of a rotor of the motor/generator.

4. The power transmission system or claim 3, wherein the torque converter is configured to have a single pinion planetary gear set having the first rotating element that is a sun gear, the second rotating element that is a planetary carrier, and the third rotating element that is a ring gear.

5. The power transmission system or claim 1, wherein the torque converter is configured to have a single pinion planetary gear set having the first rotating element that is a sun gear, the second rotating element that is a planetary carrier, and the third rotating element that is a ring gear.

6. The power transmission system of claim 1, wherein:
    as the at least one input gear fixedly disposed on the second input shaft, a first input gear operated as second-shift and reverse-shift input gears and a second input gear operated as fourth-shift and sixth-shift input gears are sequentially disposed from front to back, and
    as the at least one input gear fixedly disposed on the first input shaft, a third input gear operated as a fifth-shift input gear, a fourth input gear operated as a first-shift input gear, and a fifth input gear operated as a third-shift input gear are sequentially disposed from front to back.

7. The power transmission system of claim 6, wherein the shift output device includes:
    a first shift output mechanism that selectively synchronous-connects four change gears to a first output shaft by a selective operation of first and second synchronizers disposed on the first output shaft disposed in parallel with the first and second input shafts to output the rotation power at four shift ratios;
    a second shift output mechanism that selectively synchronous-connects three change gears to a second output shaft by a selective operation of third and fourth synchronizers disposed on the second output shaft disposed in parallel with the first and second input shafts to output the rotation power at three shift ratios; and
    a reverse output mechanism that is configured to have a reverse shaft disposed in parallel with the second input shaft and reverse input gears disposed on the reverse shaft to be engaged between one of the input gears on the second input shaft and one of the change gears on the second output shaft.

8. The power transmission system of claim 7, wherein the first synchronizer selectively synchronous-connects a second-shift change gear engaged with the first input gear and a fourth-shift change gear engaged with the second input gear to the first output shaft.

9. The power transmission system of claim 7, wherein the second synchronizer selectively synchronous-connects a first-shift change gear engaged with the fourth input gear and a third-shift change gear engaged with the fifth input gear to the first output shaft.

10. The power transmission system of claim 7, wherein the third synchronizer selectively synchronous-connects a reverse change gear engaged with the reverse input gears to be power-connected to the first input gear and a sixth-shift change gear engaged with the second input gear to the second output shaft.

11. The power transmission system of claim 7, wherein the fourth synchronizer selectively synchronous-connects a fifth-shift change gear engaged with the third input gear to the second output shaft.

12. The power transmission system of claim 7, wherein the reverse input gears are configured to have a large-diameter first reverse input gear disposed on the reverse shaft to be engaged with the first input gear and a small-diameter second reverse input gear engaged with a reverse change gear.

* * * * *